US006191381B1

(12) United States Patent
Kabir

(10) Patent No.: US 6,191,381 B1
(45) Date of Patent: Feb. 20, 2001

(54) TAPERED ELECTRODE FOR PLASMA ARC CUTTING TORCHES

(75) Inventor: Arefin Kabir, Canton, MI (US)

(73) Assignee: The ESAB Group, Inc., Florence, SC (US)

(*) Notice: Under 35 U.S.C. 154(b), the term of this patent shall be extended for 0 days.

(21) Appl. No.: 09/487,924

(22) Filed: Jan. 19, 2000

Related U.S. Application Data

(60) Provisional application No. 60/129,281, filed on Apr. 14, 1999.

(51) Int. Cl.[7] ...................................................... B23K 10/00

(52) U.S. Cl. ................................ 219/121.52; 219/121.59; 219/121.48; 219/119

(58) Field of Search ............................ 219/121.5, 121.48, 219/121.52, 121.59, 121.39, 74, 75, 119

(56) References Cited

U.S. PATENT DOCUMENTS

| | | | |
|---|---|---|---|
| 3,019,330 | 1/1962 | Guida . | |
| 3,198,932 | 8/1965 | Weatherly . | |
| 3,363,086 | 1/1968 | Ecklund et al. . | |
| 3,592,994 | 7/1971 | Ford . | |
| 3,597,649 | 8/1971 | Bykhovsky et al. . | |
| 3,930,139 | 12/1975 | Bykhovsky et al. . | |
| 4,701,590 | 10/1987 | Hatch . | |
| 4,766,349 | 8/1988 | Johansson et al. . | |
| 4,864,097 | 9/1989 | Wallner . | |
| 5,105,061 | 4/1992 | Blankenship . | |
| 5,451,739 * | 9/1995 | Nemchinsky et al. | 219/121.52 |
| 5,464,962 | 11/1995 | Luo et al. . | |

* cited by examiner

*Primary Examiner*—Mark Paschall
(74) *Attorney, Agent, or Firm*—Alston & Bird LLP

(57) ABSTRACT

An electrode for a plasma arc cutting torch, wherein the electrode comprises a holder having a tapered tip and emissive element concentrically disposed therein. The holder has an included angle of taper at the tip of between about 25° and about 40° and a diameter at the tip approximately equal to, or slightly larger than, the diameter of the end surface of the emissive element. The electrode is configured such that the holder comprises a relatively thin holder wall at the tip of the electrode which evaporates due to the heat from the adjacent arc generated through the emissive element such that the tapered tip erodes generally simultaneously with the emissive element. Generally simultaneous erosion of both the holder and the emissive element thus avoids the problems of overheating and/or double arcing and extends the service life of the electrode. A method of operation of a plasma arc torch is also provided.

32 Claims, 5 Drawing Sheets

TAPERED ELECTRODE FOR PLASMA ARC CUTTING TORCHES

CROSS-REFERENCE TO RELATED APPLICATION

This application claims the benefit of U.S. Provisional Application Ser. No. 60/129,281, filed Apr. 14, 1999.

FIELD OF THE INVENTION

The present invention relates to plasma arc torches and, more particularly, to an electrode for a plasma arc cutting torch.

BACKGROUND OF THE INVENTION

Electrodes for plasma arc cutting torches are typically configured with a generally cylindrical holder having a rounded or chamfered edge at the tip of the electrode and an emissive element disposed therein. The holder and the emissive element further generally combine to form a flat surface at the tip of the electrode. In this configuration, the holder is usually made of copper and has a substantially uniform wall thickness extending along the length of the holder to the tip of the electrode. During operation of the torch, the emissive element tends to erode and form a cavity inside the copper holder. Overheating and/or double arcing may then occur at the end of the copper holder due to the eroded emissive element, thus damaging the electrode and shortening the service life thereof.

A typical operational sequence of an electrode for a plasma arc cutting torch occurs as illustrated in FIG. 1. As noted above, the holder is usually made of copper and is cylindrical in shape, having a rounded or chamfered edge at the tip. A cylindrical emissive element made of, for instance, hafnium is embedded into a longitudinal bore in the holder such that the holder and the electrode are concentrically disposed with respect to each other. Together, the emissive element and the holder form a flat face at the tip of the electrode as shown in FIG. 1A. As the torch is used, the emissive element will erode and recede into the holder, as shown in FIG. 1B, thus forming a cavity within the holder. As the emissive element continues to erode from the operation of the torch and the cavity within the holder deepens, two events may possibly occur. First, as shown in FIG. 1B, double arcing may occur. That is, instead of the arc passing from point X to the workpiece, the arc will pass from point Y to the nozzle surrounding the tip of the electrode and then on to the workpiece, thereby causing damage to the electrode and/or the nozzle. Secondly, as the emissive element erodes and continues to deepen the cavity within the holder, the arc passing between the emissive element and the workpiece will overheat the holder at the tip of the electrode from which the emissive element has receded as shown in FIG. 1C. In either scenario, the holder may crack at the tip thereof, as shown in FIG. 1D, and create significant damage to the electrode and/or the surrounding nozzle. Accordingly, a number of attempts have been made to modify electrodes, consisting of a holder and an emissive element, to extend the service life thereof.

For example, U.S. Pat. No. 3,198,932 to Weatherly discloses a non-consumable electrode for use in electric arc processes such as cutting, welding, and electric arc furnace processing of metals. The '932 patent discloses an electrode that consists of a water-cooled copper holder having embedded therein an insert of zirconium. It is postulated by the patentee of the '932 patent that the operating life of the insert at relatively high currents can be increased by increasing both the diameter of the insert and the diameter of the holder while maintaining a certain dimensional relationship between the insert and the holder. Water cooling of the copper holder was also found to be critical in extending the operating life of the electrode.

In a further example, U.S. Pat. No. 4,766,349 to Johansson et al. discloses an electrode for electric arc processes composed of a water-cooled holder into which is fitted a case-hardened diffusion-coated insert of zirconium or hafnium, wherein the diffusion zone consists of carbide, nitride, boride, or silicide. The compounds in the diffusion zone have very high melting points which suppress reactions between the holder and the insert that cause deterioration of the electrode. However, the introduction of the diffusion-coated insert into the water-cooled copper holder must be accompanied with a protecting finish of nickel, chromium, or platinum metal on the surface of the holder in order to prevent its deterioration during operation.

In addition, U.S. Pat. No. 3,930,139 to Bykhovsky et al. discloses a non-consumable electrode for oxygen arc working comprising a holder produced from copper or alloys thereof and an active insert fastened to the end face of the holder. The insert is in thermal and electrical contact with the holder through a metal distance piece disposed between the insert and the holder and over their entire contact surface area. The metal distance piece is manufactured from aluminum or alloys thereof and the insert is made from hafnium. In operation of the torch, the insert is still subject to erosion. However, when operating in oxygen, an aluminum oxide is formed on the metal spacer. The aluminum oxide is a high melting temperature compound which acts as a thermal shield protecting the copper holder both from overheating and oxidation.

Thus, attempts to extend the service life of electrodes for plasma arc torches generally involve increasing the size of both the holder and the insert, as disclosed in the '932 patent to Weatherly, or providing a barrier between the insert and the holder, such as the diffusion zone disclosed in the '349 patent to Johansson et al., and the metal distance piece disclosed in the '139 patent to Bykhovsky et al. Increasing the size of both the insert and the holder in a specified dimensional relationship results in a larger electrode which may be cumbersome and/or unsuitable for precision work. In addition, special diffusion treatments for the insert may be difficult to manufacture consistently and/or may not be cost effective in relation to the gain in the life of the electrode. Further, the addition of a distance piece between the insert and the holder increases the number of components in the assembly and may also add to the cost and increase the difficulty of assembly of the electrode.

Thus, there exists a need for a simple, cost-effective electrode for a plasma arc cutting torch having a suitably long service life. Preferably, the electrode comprises a holder having an emissive element, wherein the holder and the emissive insert are made of materials with suitable characteristics. In addition, there exists a need for an electrode for a plasma arc cutting torch which avoids the problems of double arcing or overheating as the emissive element erodes within the holder.

SUMMARY OF THE INVENTION

The above and other needs are met by the present invention which, in one embodiment, provides an electrode for a plasma arc cutting torch comprising an elongate emissive element defining a central axis and a holder having a generally cylindrical portion and a tapered end for holding the emissive element. The emissive element has an end surface adapted to emit an arc to a workpiece and is held in the holder such that the end surface is exposed to allow emission of the arc. The emissive element is comprised of an erodible material and defines an erosion rate in the axial direction as the arc is emitted from the end surface and gradually erodes the emissive element. The holder is also comprised of an erodible material and is advantageously dimensioned so as to define an erosion rate in the axial direction that is substantially the same as the erosion rate of the emissive element so that the emissive element and the holder erode substantially simultaneously as the torch is operated.

According to one advantageous embodiment, the emissive element is cylindrical and the tapered end of the holder about the end surface of the emissive element has a diameter at least equal to the diameter of the emissive element. The tapered end of the holder may taper linearly from the generally cylindrical portion to the end surface of the emissive element, preferably with an included taper angle of between about 25 degrees and about 40 degrees. In a preferred embodiment, the tapered end tapers linearly to form an included taper angle of at least about 30 degrees. The tapered end of the holder may also taper nonlinearly from the generally cylindrical portion to the end surface of the emissive element, for example, parabolically or discontinuously with a tapered portion and a thin cylindrical portion. The end surface of the emissive element may be, for example, a flat plane or may extend outwardly of the holder in the shape of, for instance, a cone or a parabola. In one embodiment, the holder is comprised of, for example, copper, a copper alloy, silver, or a silver alloy, while the emissive element is comprised of, for instance, hafnium, a hafnium alloy, zirconium, or a zirconium alloy.

Another advantageous aspect of the present invention is a plasma arc cutting torch comprising a nozzle assembly defining a bore, a plasma gas supply, and an electrode disposed adjacent the bore in the nozzle, wherein the plasma gas supply is adapted to provide a plasma gas flow about the electrode and through the bore in the nozzle. The electrode comprises an elongate emissive element defining a central axis and a holder having a generally cylindrical portion and a tapered end for holding the emissive element. The emissive element has an end surface adapted to emit an arc to a workpiece and is held in the holder such that the end surface is exposed to allow emission of the arc. Preferably, the emissive element is comprised of an erodible material and defines an erosion rate in the axial direction as the arc is emitted from the end surface and gradually erodes the emissive element. Most preferably, the holder is also comprised of an erodible material and is dimensioned so as to define an erosion rate in the axial direction that is substantially the same as the erosion rate of the emissive element so that the emissive element and the holder erode substantially simultaneously as the torch is operated.

Still another advantageous aspect of the present invention comprises a method of operating a plasma arc torch. First, a plasma arc torch is provided comprising a nozzle defining a bore and an electrode disposed adjacent the bore in the nozzle, wherein the electrode comprises a holder having a tapered end and an elongate emissive element having an end surface adapted to emit an arc to a workpiece and disposed within the tapered end such that the end surface is exposed to allow emission of the arc through the bore. Preferably, the holder and the emissive element are each comprised of an erodible material and are configured to erode generally simultaneously as the torch is operated. A process gas is then flowed through the nozzle, about the electrode, and through the bore. An electrical current is then applied to the electrode so as to cause the electrode to cooperate with the process gas and form a plasma arc emitted from the emissive element through the bore. Preferably, the emission of the plasma arc causes erosion in each of the holder and the emissive element at substantially equal erosion rates in the axial direction.

Thus, advantageous embodiments of an electrode for a plasma arc cutting torch according to the present invention provide an electrode configured such that the holder tapers to provide a relatively thin holder wall at the tip of the electrode. As the torch is used, the thin wall of the holder at the tip of the electrode will evaporate due to the heat from the adjacent arc generated through the emissive element and will erode generally simultaneously with the emissive element. Since the holder and the emissive element erode generally simultaneously, no cavity is formed within the holder and thus the problems of overheating and/or double arcing are avoided and the service life of the electrode accordingly extended, thereby providing a simple, cost-effective electrode for plasma arc cutting torches.

BRIEF DESCRIPTION OF THE DRAWINGS

Some of the advantages of the present invention having been stated, others will appear as the description proceeds, when considered in conjunction with the accompanying drawings, which are not necessarily drawn to scale, in which.

DETAILED DESCRIPTION OF A PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
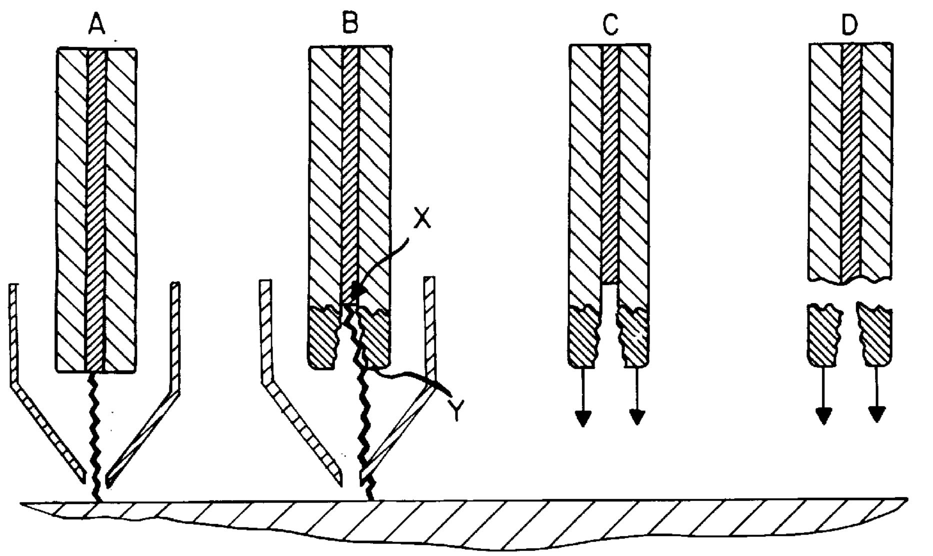
FIGS. 1A–1D show a cross-sectional operation and deterioration sequence of a prior art copper-hafnium electrode for an air-cooled plasma arc cutting torch.
Figure 2:
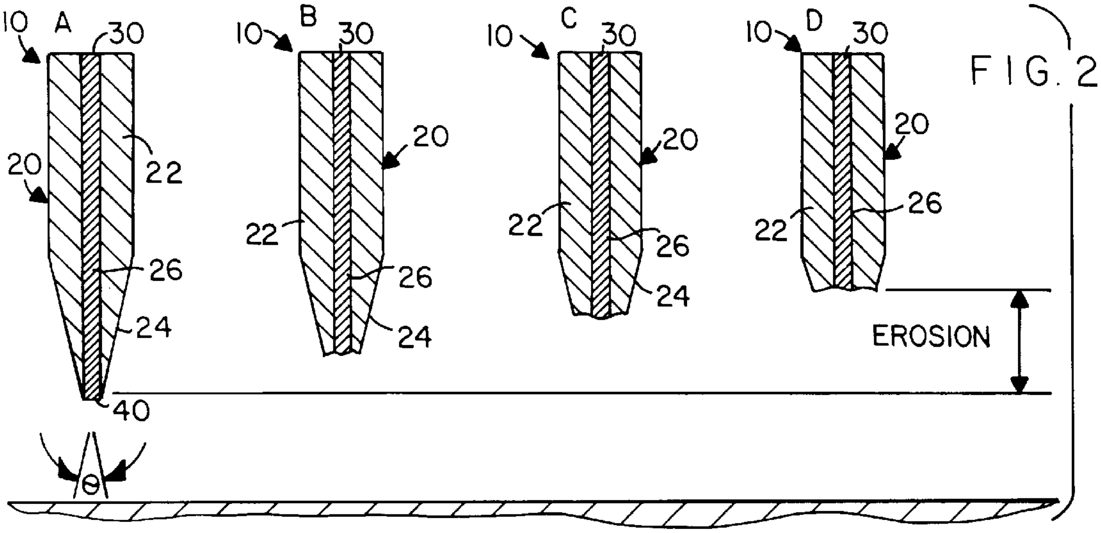
FIGS. 2A–2D show a cross-sectional operation and deterioration sequence of a tapered electrode for a plasma arc cutting torch according to one embodiment of the present invention.

FIG. 1 shows an operation and deterioration sequence of a representative copper-hafnium electrode for a plasma arc cutting torch. In comparison, FIG. 2 shows an operation and deterioration sequence of one embodiment of a tapered electrode for a plasma arc cutting torch according to the present invention, indicated generally by the numeral 10. In this embodiment, the electrode 10 generally consists of a holder 20 and an emissive element 30 and may be used in a plasma arc torch wherein the electrode is preferably air-cooled or is cooled by another suitable method consistent with the scope and spirit of present invention. In some instances, such as with water-cooled torches it may be advantageous to have an intermediate element disposed between the emissive element 30 and the holder 20. For example, the intermediate element may be a silver separator sleeve as disclosed in U.S. Pat. No. 5,023,425 to Severance, Jr., which is incorporated in its entirety herein by reference.

Figure 4A:
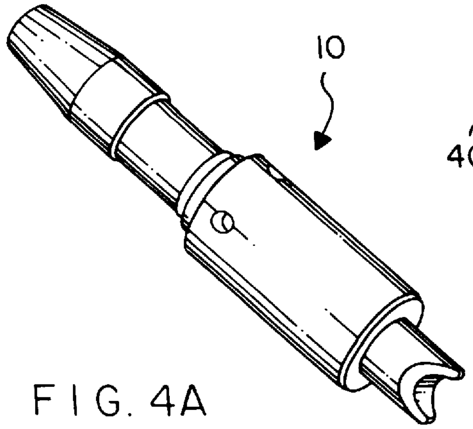
FIG. 4A is a perspective view of a tapered electrode according to one embodiment of the present invention
Figure 4B:
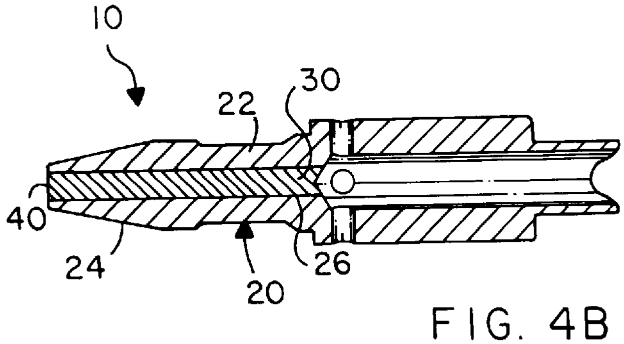
FIG. 4B is a cross-sectional view of a tapered electrode according to one embodiment of the present invention.
Figure 4C:
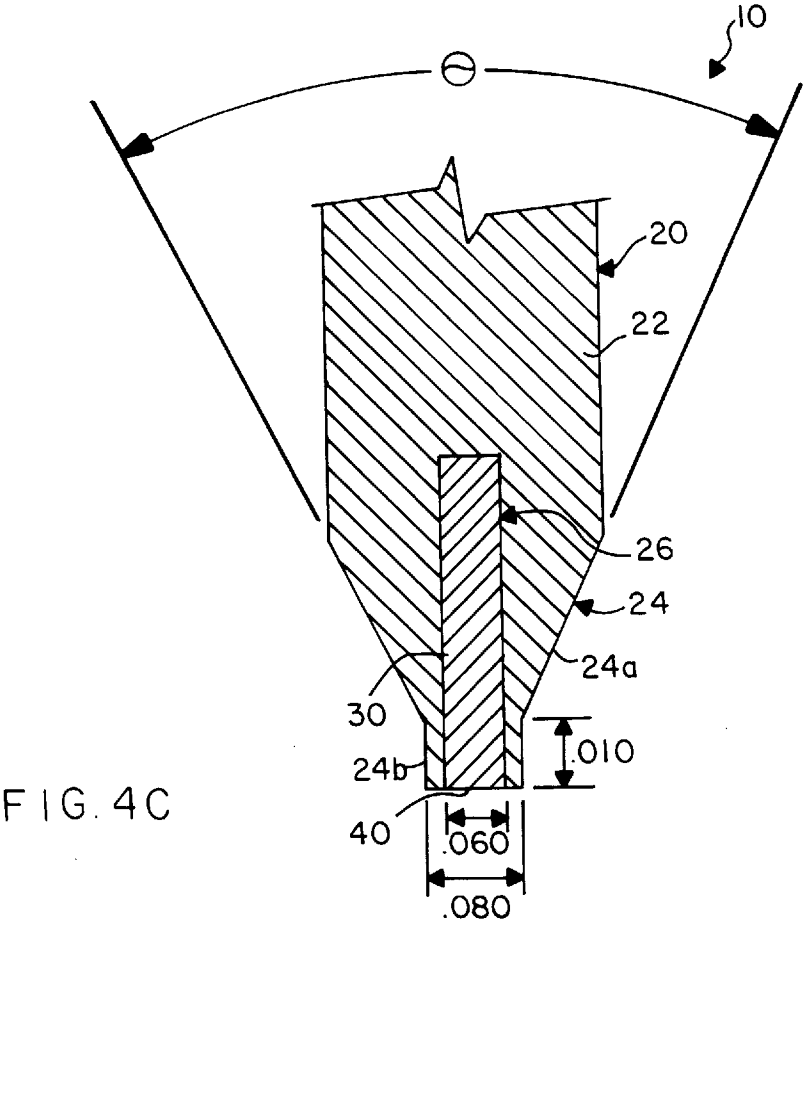
FIG. 4C is a cross-sectional view of a tapered electrode according to an alternate embodiment of the present invention illustrating a holder having a tapered portion ending in a cylindrical portion surrounding the tip of the emissive element.

The holder 20 is preferably made of an erodible material, such as copper, a copper alloy, silver, or a silver alloy. The holder 20 further comprises a generally cylindrical portion 22, a tapered tip 24, and defines a longitudinal circular bore 26 therethrough. The emissive element 30 is preferably made an erodible material, such as hafnium, a hafnium alloy, zirconium, a zirconium alloy, or other material known in the art and having suitable characteristics. Further, in a preferred embodiment, the emissive element 30 is in the form of a circular rod having an end surface 40. The cylindrical emissive element corresponds in dimension to the bore 26 in the holder 20 and may be press fit, brazed, co-extruded, or otherwise embedded into the bore 26 in the holder 20 such that the emissive element 30 and the holder 20 are concentrically disposed and the end surface 40 is exposed at the tip of the electrode 10. Further, the tapered tip 24 of the holder 20 tapers or otherwise diametrically decreases toward the end surface 40 at the tip of the electrode 10 such that the diameter of the tapered tip 24 is approximately equal to, or slightly larger than, the diameter of the emissive element 30 across the end surface 40. The tapered tip 24 may taper linearly or may decrease in diameter toward the tip of the electrode 10 in any suitable manner, such as according to a parabolic function, consistent with the scope and spirit of embodiments of the present invention as described herein. In some embodiments of the present invention, the diameter of the tapered tip 24 may be larger than the diameter of the end surface 40. For example, as shown in FIG. 4C, the tapered tip 24 of the holder 20 may have a tapered portion 24*a* ending in a thin cylindrical portion 24*b* surrounding the emissive element 30. Further, the end surface 40 of the emissive element 30 may comprise a flat face or may extend beyond the tapered portion in the shape of a cone, parabola, or any shape suitable for and consistent with the scope and spirit of preferred embodiments of the present invention as described herein.

As shown in FIG. 2, in the direction opposite the end surface 40, the tapered tip 24 expands to the diameter of the generally cylindrical portion 22 of the holder 20 such that the included angle, θ, of the expansion is preferably between about 25° and about 40°. Various factors, such as the operating current of the torch, the operating voltage of the torch, the workpiece material, the air flow rate, the inlet air pressure, and other cut-influencing parameters, determine an optimum value of the included angle, θ, for a particular torch configuration. In one advantageous embodiment, the included angle, θ, is at least about 30°. The factors which determine the included angle, θ, also contribute to determining the diameter of the tapered tip 24 at the exposed surface 40, wherein the included angle, θ, and the diameter of the tapered tip 24 are determined such that the holder 20 and the emissive element 30 erode generally simultaneously as the torch is used. FIGS. 4A and 4B shows one embodiment of a tapered electrode for a plasma arc cutting torch according to the present invention as described herein.

As shown in FIG. 1, a typical prior art copper-hafnium electrode exhibits erosion of the hafnium emissive element as the torch is operated. While not wishing to be bound by theory, the inventor speculates that double arcing and/or overheating may lead to significant damage to the electrode. As the emissive element erodes and forms a cavity within the holder, the arc passing from the emissive element to the workpiece may cause overheating of the holder extending past the emissive element toward the workpiece at the tip of the electrode, thus giving rise to cracks in the copper holder. Further, as the emissive element erodes to form a cavity of a certain depth within the holder, the arc may leave from the holder at the tip of the electrode (instead of from the emissive element) and jump to the nozzle surrounding the tip of the electrode before jumping therefrom to the workpiece, thus resulting in double arcing. As a result, the nozzle may be damaged and/or the holder at the tip of the electrode may crack and cause damage to the electrode.

As shown in FIG. 2, more particularly in FIG. 2A, the tapered holder 20 having a diameter at the tip of the electrode approximately equal to the diameter of the end surface 40 of the emissive element 30 results in the holder 20 having a relatively thin holder wall surrounding the emissive element 30 at the tip of the electrode 10. As the torch is used, the emissive element will erode as a result of the arc being emitted from the tip thereof. However, no cavity is formed within the holder 20 since the thin holder wall at the tip of the electrode 10 will vaporize due to the high heat from the arc produced through the adjacent emissive element 30. Preferably, erosion of both the emissive element 30 and the holder 20 at the tip of the electrode 10 will occur generally simultaneously as shown in FIGS. 2B–2D. Thus, since no cavity is formed within the holder 20, the possibility of double arcing and/or overheating of the holder is substantially eliminated.

Figure 3:
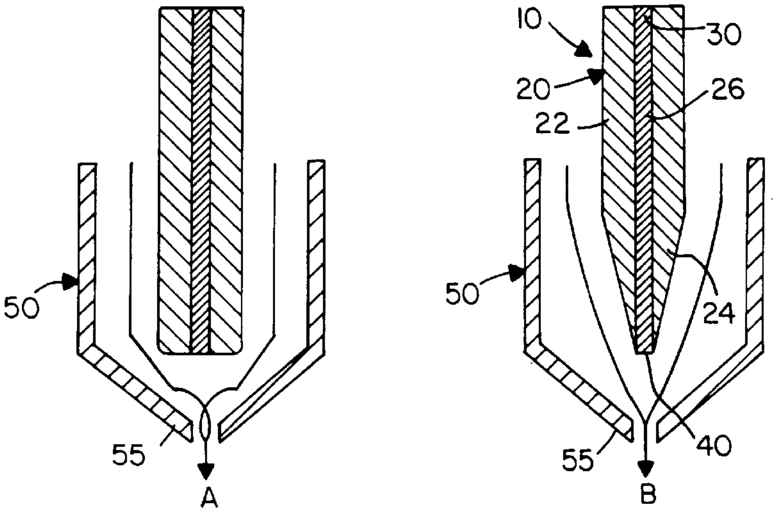
FIGS. 3A–3B show cross-sectional views comparing gas flows through the nozzle between a prior art electrode and a tapered electrode in accordance with one embodiment of the present invention.

FIG. 3 shows a typical configuration of a plasma arc torch wherein the tip of the electrode is generally surrounded by a nozzle 50 and a gas is flowed therebetween and out through a bore in the tip of the nozzle 55. As illustrated in FIG. 3A, a prior art electrode, having a blunt or chamfered tip, closely approaches the interior surface of the nozzle at the chamfered edge, thus leading to constriction of the gas flow and turbulence as the gas flows out through the bore in the tip of the nozzle 55. Setback of the electrode is generally defined as the spacing between the tip of the electrode and the interior surface of the nozzle. With prior art electrodes, the emissive element will erode as the torch is used while the holder will remain relatively unchanged from its original configuration. Thus, the setback of a prior art electrode will remain relatively unchanged as the torch is operated.

In contrast, a tapered electrode 10 according to one particularly advantageous embodiment of the present invention is further shown in FIG. 3B in a relation to a nozzle 50 surrounding the tip thereof. As shown, the tapered electrode 10 results in little or no constriction of the gas flow between the electrode 10 and the nozzle 50 as the gas is flowed through the tip of the nozzle 55 and, therefore, produces less turbulence. Further, as the torch is used, the emissive element 30 and the holder 20 will erode generally simultaneously. Since both the holder 20 and the emissive element 30 will erode as the torch is used, the setback of the electrode 10 will physically increase with time. While still not wishing to be bound by theory, the inventor speculates that the less constricted, less turbulent gas flow between the electrode 10 and the nozzle 50, as well as the tapered electrode 10 configuration, may advantageously alter the torch characteristics. More specifically, the inventor speculates that the tapered electrode 10 configuration and the resulting altered gas flow may result in approximately the same or slightly increased erosion rate as prior art electrodes as the setback increases, while the generally simultaneous erosion of the holder and the emissive element allows the electrode to tolerate higher erosion, thus contributing to the enhancement of the service life of the electrode.

As a further consideration, as the setback of the electrode increases due to erosion, a larger length of the plasma arc will be present within the nozzle during torch operation. Accordingly, the nozzle will be subject to elevated temperatures due to the increased length of the plasma arc and, when the electrode setback exceeds a threshold value, the nozzle may fail instead of, or in addition to, the electrode. The actual failure mechanism depends on the torch system design, the air or cooling flow, the operational current of the torch, the pertinent materials used, and other parameters. Thus, an additional consideration involves limiting the amount of erosion to avoid damage to the nozzle, since damage to the nozzle at the expense of increased electrode life is not desirable. In addition, as the erosion of the electrode increases, the quality of the cut may start deteriorating. Therefore, an optimal range of included angles of taper can be chosen for the particular electrode which will vary according to electrode, nozzle, torch, power supply, and cooling system designs and configurations.

The enhanced service life of such tapered electrodes is illustrated by experiments performed on a model PT-27 plasma arc cutting torch manufactured by the ESAB Group of Florence, S.C., also the assignee of the present invention, as shown in the following examples.

EXAMPLE 1

Experiments were performed to determine the optimum included angle of taper of the electrode using following the test parameters:

A live test on a carbon block was performed with intermittent cuts (30 sec. cut, 4 sec. rest).

| | |
|---|---|
| Air inlet pressure: | 75 psig |
| Air flow rate: | 240–250 CFH |
| Stand off: | 3/16 inch |
| Torch current: | 80 Amperes |
| Hafnium emissive element diameter: | 0.062 inch |
| Electrode face diameter for tapered electrode: | 0.062 inch |

Figure 5A:
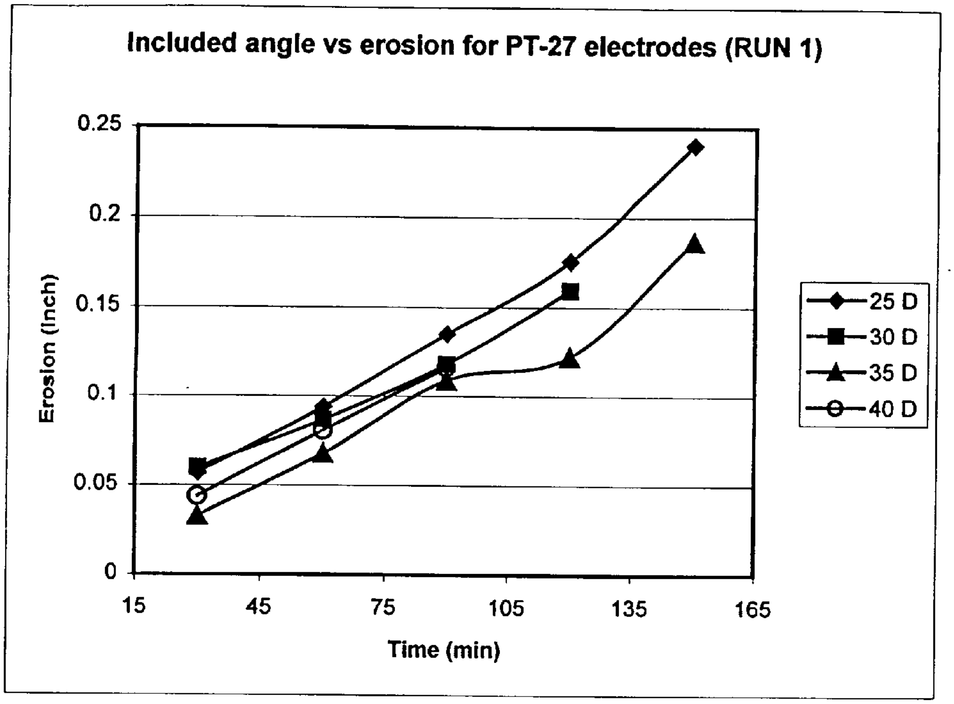
FIG. 5A is a graph of a first test run on a sequence of tapered electrodes illustrating the effect of the included angle of taper on the amount of electrode erosion according to embodiments of the present invention.
Figure 5B:
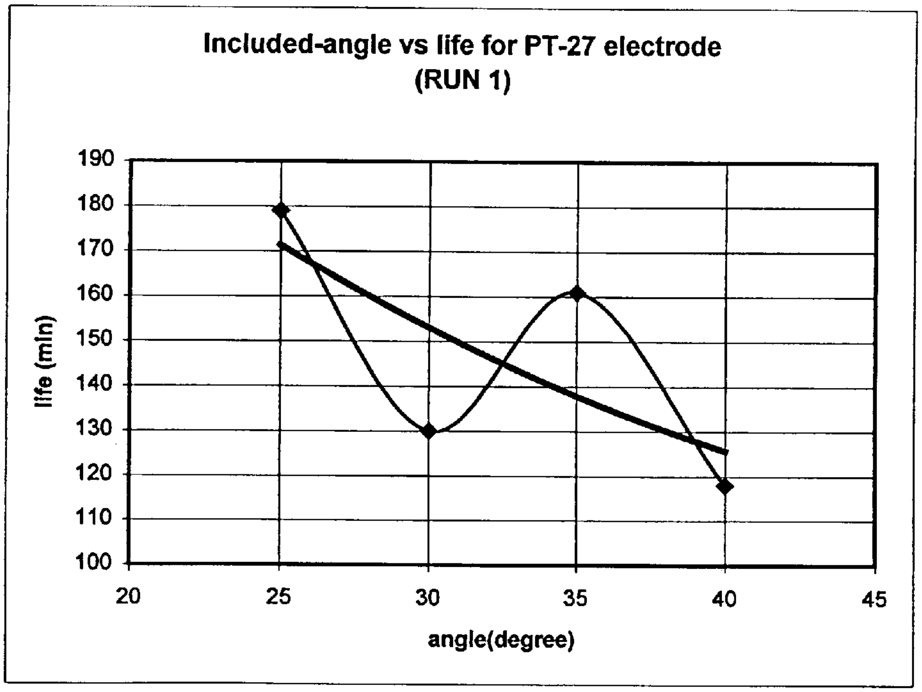
FIG. 5B is a graph of a first test run on a sequence of tapered electrodes illustrating the effect of the included angle of taper on the service life of the electrode according to embodiments of the present invention.
Figure 6A:
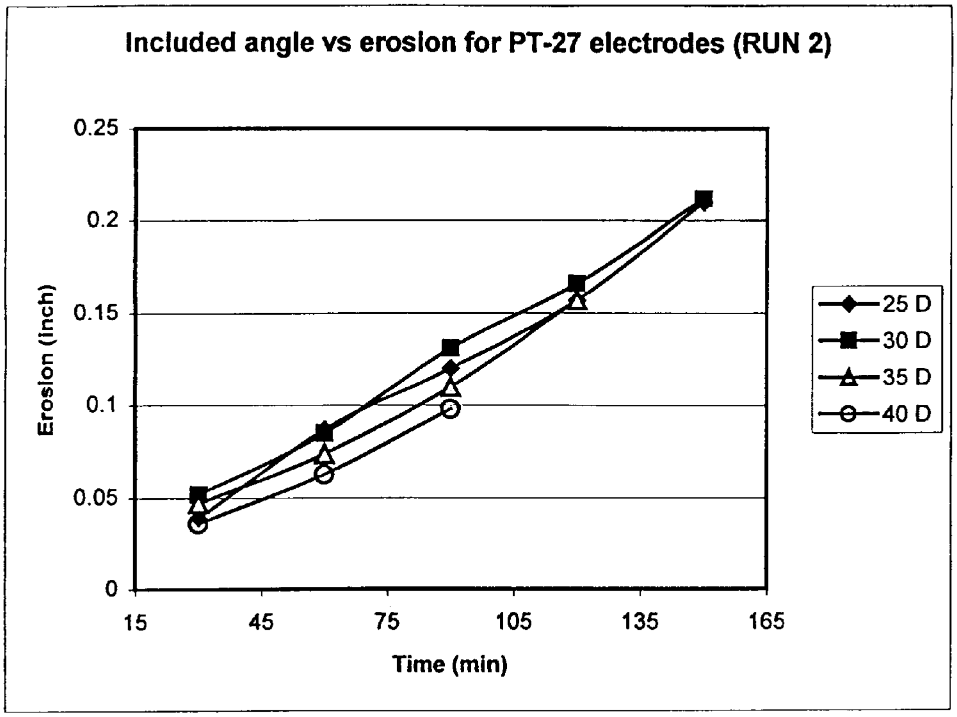
FIG. 6A is a graph of a second test run on a substantially identical sequence of tapered electrodes, under the same conditions as the first test run, illustrating the effect of the included angle of taper on the amount of electrode erosion according to embodiments of the present invention.
Figure 6B:
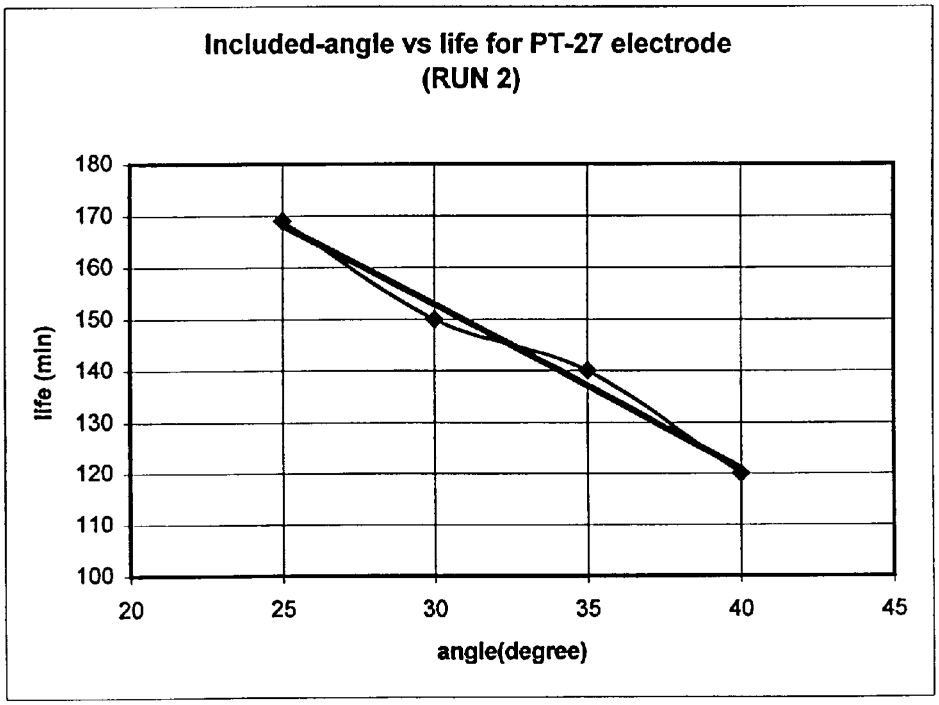
FIG. 6B is a graph of a second test run on a substantially identical sequence of tapered electrodes, under the same conditions as the first test run, illustrating the effect of the included angle of taper on the service life of the electrode according to embodiments of the present invention.

The included angle of taper was varied in 5 degree increments from 25 degrees to 40 degrees to explore the effect of the included angle of taper on the service life of the electrode. Two individual sequences of tapered electrodes were tested and the results graphically presented as shown in FIGS. 5 and 6. The results generally indicate that increasing the included angle of taper reduces both the amount of erosion of the electrode and the service life of the electrode. However, for the particular electrode configuration for the PT-27 torch which was the subject of this test, occasional nozzle failure preceding electrode failure was observed for included angles of taper less than 30 degrees. Thus, for the PT-27 electrode, the included angle of taper thereof was determined to be preferably at least about 30 degrees.

EXAMPLE 2

Using the PT-27 torch, experiments were performed both with a prior art copper-hafnium electrode having a rounded or chamfered tip and with a tapered copper-hafnium electrode in accordance with one embodiment of the present invention using an included angle of taper of 34.6 degrees. The test parameters and the configuration of the tapered electrode were as follows:

A live test on a carbon block was performed with intermittent cuts (30 sec. cut, 4 sec. rest).

| | |
|---|---|
| Air inlet pressure: | 75 psig |
| Air flow rate: | 240–250 CFH |
| Stand off: | 3/16 inch |
| Torch current: | 80 Amperes |
| Hafnium emissive element diameter: | 0.062 inch |
| Electrode face diameter for tapered electrode: | 0.062 inch |
| Included angle of taper for electrode, $\theta$: | 34.6 degrees |

Using the same test parameters as shown above, the prior art electrode with a blunt or chamfered tip showed a life of 48 minutes with erosion of 0.031 inches after 45 minutes. However, the tapered electrode, according to a preferred embodiment of the present invention, showed a life of 161 minutes with erosion of 0.186 inches after 150 minutes. No significant difference was found in the cutting speed or cutting quality between the prior art electrode and the tapered electrode after manual cutting and gouging of different thicknesses of metals for in excess of two hours. Thus, in this experiment, the tapered electrode was found to produce the same cut quality and speed as that of the prior art electrode while withstanding at least approximately 400–500% more erosion and exhibiting at least about a 150–230% increase in the electrode life.

Figure 7:
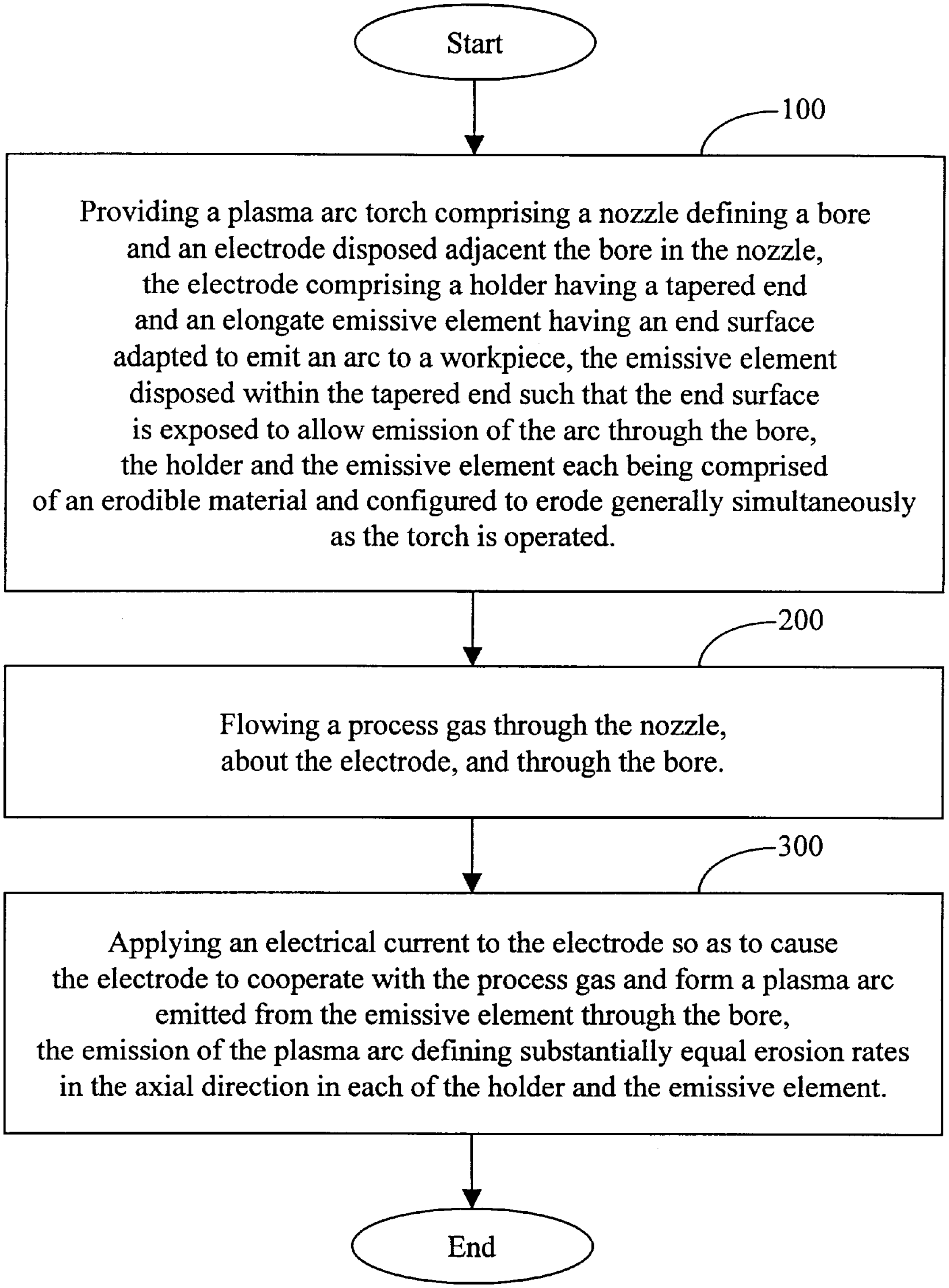
FIG. 7 is a flowchart illustrating a process of operating a plasma arc torch in accordance with embodiments of the present invention.

FIG. 7 shows a method of operating a plasma arc torch in accordance with embodiments of the present invention. First, a plasma arc torch is provided comprising a nozzle defining a bore and an electrode disposed adjacent the bore in the nozzle, wherein the electrode comprises a holder having a tapered end and an elongate emissive element having an end surface adapted to emit an arc to a workpiece and disposed within the tapered end such that the end surface is exposed to allow emission of the arc through the bore (block 100). Preferably, the holder and the emissive element are each comprised of an erodible material and are configured to erode generally simultaneously as the torch is operated. A process gas is then flowed through the nozzle, about the electrode, and through the bore (block 200). An electrical current is then applied to the electrode so as to cause the electrode to cooperate with the process gas and form a plasma arc emitted from the emissive element through the bore (block 300). Preferably, the emission of the plasma arc causes erosion in each of the holder and the emissive element at substantially equal erosion rates in the axial direction.

Thus, advantageous embodiments of an electrode for a plasma arc cutting torch according to the present invention provide an electrode configured such that the holder tapers to provide a relatively thin holder wall at the tip of the electrode. As the torch is used, the thin wall of the holder at the tip of the electrode will evaporate due to the heat from the adjacent arc generated through the emissive element and will erode generally simultaneously with the emissive element. Since the holder and the emissive element erode generally simultaneously, no cavity is formed within the holder and thus the problems of overheating and/or double arcing are avoided and the service life of the electrode accordingly extended, thereby providing a simple, cost-effective electrode for plasma arc cutting torches.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claim. Although specific terms are employed herein, they are used in a generic and descriptive sense only and not for purposes of limitation.

That which is claimed:

1. An electrode for a plasma arc torch, said electrode comprising:

an elongate emissive element defining a central axis and having an end surface adapted to emit an arc to a workpiece, said emissive element being comprised of an erodible material and defining an erosion rate in the axial direction as the arc is emitted from the end surface and gradually erodes the emissive element; and a holder having an end for holding the emissive element such that the end surface of the emissive element is exposed to allow emission of the arc, the holder also comprised of an erodible material and dimensioned so as to define an erosion rate in the axial direction that is substantially the same as the erosion rate of the emissive element such that the emissive element and the holder erode substantially simultaneously as the torch is operated.

2. An electrode according to claim 1 wherein the holder has a generally cylindrical portion adjacent to the end thereof and the end of the holder further comprises a tapered portion extending from the generally cylindrical portion.

3. An electrode according to claim 2 wherein the emissive element is cylindrical.

4. An electrode according to claim 3 wherein the end of the holder about the end surface of the emissive element has a diameter at least equal to the diameter of the emissive element.

5. An electrode according to claim 4 wherein the tapered portion of the holder tapers linearly from the generally cylindrical portion to the end surface of the emissive element.

6. An electrode according to claim 5 wherein the tapered portion of the holder tapers to form an included taper angle of between about 25 degrees and about 40 degrees.

7. An electrode according to claim 5 wherein the tapered portion of the holder tapers linearly to form an included taper angle of at least about 30 degrees.

8. An electrode according to claim 4 wherein the tapered portion of the holder tapers nonlinearly from the generally cylindrical portion to the end surface of the emissive element.

9. An electrode according to claim 8 wherein the tapered portion of the holder tapers parabolically from the generally cylindrical portion to the end surface of the emissive element.

10. An electrode according to claim 8 wherein the end of the holder further comprises a thin cylindrical portion disposed about the end surface of the emissive element and a tapered portion extending from the generally cylindrical portion of the holder to the thin cylindrical portion.

11. An electrode according to claim 1 wherein the end surface of the emissive element is a flat plane.

12. An electrode according to claim 1 wherein the end surface of the emissive element extends outwardly of the holder in the form of at least one of a cone and a parabola.

13. An electrode according to claim 1 wherein the holder is comprised of at least one of copper, a copper alloy, silver, and a silver alloy.

14. An electrode according to claim 1 wherein the emissive element is comprised of at least one of hafnium, a hafnium alloy, zirconium, and a zirconium alloy.

15. A plasma arc cutting torch comprising:

a nozzle assembly defining a bore therethrough;

a process gas supply adapted to provide a process gas flow through the bore in the nozzle; and an electrode disposed adjacent the bore in the nozzle and comprising:

an elongate emissive element defining a central axis and having an end surface adapted to emit an arc to a workpiece, said emissive element being comprised of an erodible material and defining an erosion rate in the axial direction as the arc is emitted from the end surface and gradually erodes the emissive element; and a holder having an end for holding the emissive element such that the end surface of the emissive element is exposed to allow emission of the arc through the bore, the holder also comprised of an erodible material and dimensioned so as to define an erosion rate in the axial direction that is substantially the same as the erosion rate of the emissive element such that the emissive element and the holder erode substantially simultaneously as the torch is operated.

16. A torch according to claim 15 wherein the holder has a generally cylindrical portion adjacent to the end thereof and the end of the holder further comprises a tapered portion extending from the generally cylindrical portion.

17. A torch according to claim 16 wherein the emissive element is cylindrical.

18. A torch according to claim 17 wherein the end of the holder about the end surface of the emissive element has a diameter at least equal to the diameter of the emissive element.

19. A torch according to claim 18 wherein the tapered portion of the holder tapers linearly from the generally cylindrical portion to the end surface of the emissive element.

20. A torch according to claim 19 wherein the tapered portion of the holder tapers linearly to form an included taper angle of between about 25 degrees and about 40 degrees.

21. A torch according to claim 19 wherein the tapered portion of the holder tapers linearly to form an included taper angle of at least about 30 degrees.

22. A torch according to claim 18 wherein the tapered portion of the holder tapers nonlinearly from the generally cylindrical portion to the end surface of the emissive element.

23. A torch according to claim 22 wherein the tapered portion of the holder tapers parabolically from the generally cylindrical portion to the end surface of the emissive element.

24. A torch according to claim 22 wherein the end of the holder further comprises a thin cylindrical portion disposed about the end surface end of the emissive element and a tapered portion extending from the generally cylindrical portion of the holder to the thin cylindrical portion.

25. A torch according to claim 15 wherein the end surface of the emissive element is a flat plane.

26. A torch according to claim 15 wherein the end surface of the emissive element extends outwardly of the holder in the form of at least one of a cone and a parabola.

27. A torch according to claim 15 wherein the holder is comprised of at least one of copper, a copper alloy, silver, and a silver alloy.

28. A torch according to claim 15 wherein the emissive element is comprised of at least one of hafnium, a hafnium alloy, zirconium, and a zirconium alloy.

29. A method of operating a plasma arc torch having a nozzle defining a bore and having an electrode with an emissive element and a holder adjacent the bore and defining an axis, said method comprising the steps of:

flowing a process gas through the nozzle, about the electrode, and through the bore;

applying an electrical current to the electrode;

emitting a plasma arc from the emissive element, in cooperation with the process gas, through the bore;

eroding the emissive element by way of the arc so as to define an erosion rate in the axial direction; and eroding the holder by way of the arc at an erosion rate in the axial direction substantially equal to the erosion rate of the emissive element.

30. A method according to claim 29 wherein the holder eroding step further comprises eroding a holder having a linearly tapered end with an included taper angle of between about 25 degrees and about 40 degrees.

31. A method according to claim 29 wherein the holder eroding step further comprises eroding a holder having a linearly tapered end with an included taper angle of at least about 30 degrees.

32. A method according to claim 29 wherein the emissive element eroding step further comprises eroding an emissive element comprised of at least one of hafnium, a hafnium alloy, zirconium, and a zirconium alloy and the holder eroding step comprises eroding a holder comprised of at least one of copper, a copper alloy, silver, and a silver alloy.

* * * * *